United States Patent [19]
Kanota et al.

[11] Patent Number: 5,089,917
[45] Date of Patent: Feb. 18, 1992

[54] DIGITAL SIGNAL RECOVERY APPARATUS WITH MINIMIZED HIGH FREQUENCY NOISE

[75] Inventors: Keiji Kanota, Kanagawa; Hajime Inoue, Tokyo; Takahito Seki, Kanagawa, all of Japan

[73] Assignee: Sony Corporation, Tokyo, Japan

[21] Appl. No.: 439,819

[22] Filed: Nov. 21, 1989

[30] Foreign Application Priority Data

Nov. 22, 1988 [JP] Japan ................................ 63-295650

[51] Int. Cl.$^5$ .................... G11B 5/09; G06F 11/10; H03D 1/06
[52] U.S. Cl. .................... 360/45; 371/43; 375/101
[58] Field of Search ............... 360/65, 45; 371/6, 43; 375/11, 101, 103

[56] References Cited

U.S. PATENT DOCUMENTS

| | | | |
|---|---|---|---|
| 3,621,139 | 11/1971 | Gibson | 371/6 |
| 4,137,556 | 1/1979 | Sessa | 361/91 |
| 4,885,646 | 12/1989 | Kanota et al. | 360/46 |
| 4,984,099 | 1/1991 | Kanota et al. | 360/46 |

OTHER PUBLICATIONS

FIG. 2 of Applicant's Disclosure, Admitted Prior Art.
"Application of Partial-Response Channel Coding to Magnetic Recording Systems," H. Kobayashi et al., Journal of Res. and Dev., Jul. 1970, p. 368 et seq.
"The Effects of Nonlinear Distortion on Class IV Partial Response," P. Newby et al., IEEE Transactions on Magnetics, vol. Mag. 22, No. 5, Sep. 1986, p. 1203 et seq.

*Primary Examiner*—Aristotelis Psitos
*Assistant Examiner*—Won Tae C. Kim
*Attorney, Agent, or Firm*—Alvin Sinderbrand; William S. Frommer

[57] ABSTRACT

Apparatus for regenerating a coded digital signal, comprising an interference cancellation equalizer for cancelling an interference component from an input digital signal and a decoder. The equalizer includes a compensator for high frequency compensating the input digital signal, an extractor for extracting intercode interference from the compensated digital signal, and a subtracter for subtracting the extracted intercode interference from the input digital signal to produce a waveform equalized signal. The decoder recovers the original digital signal as a function of the correlation or samples of the waveform equalized signal.

31 Claims, 6 Drawing Sheets

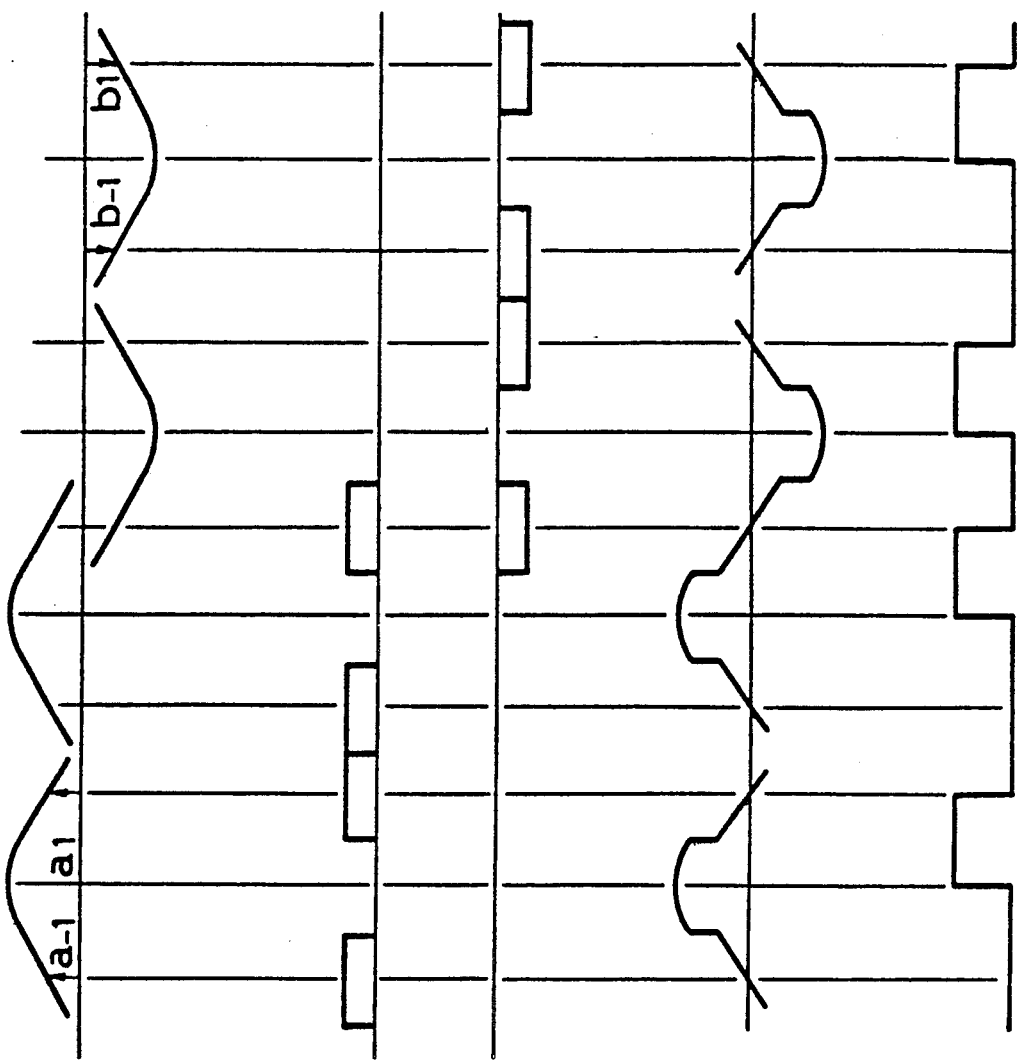

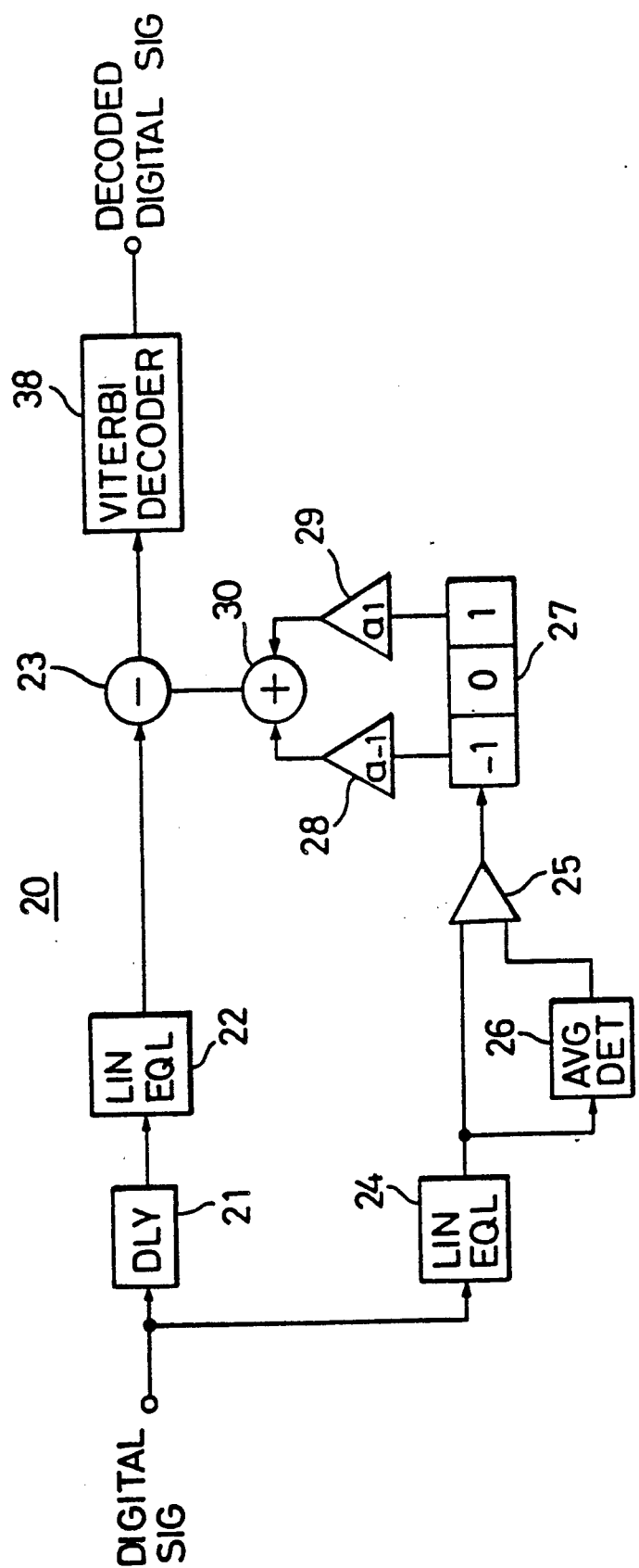

DIGITAL SIGNAL RECOVERY APPARATUS WITH MINIMIZED HIGH FREQUENCY NOISE

BACKGROUND OF THE INVENTION

1. Field of the Invention

This invention relates to digital signal recovery apparatus and, more particularly, to such apparatus in which the error rate of an equalized digital signal is reduced by minimizing high frequency noise in the digital signal. The invention finds particular application to digital recording such as a digital video tape recorder.

2. Description of the Prior Art

In a typical digital transmission system wherein digital information from a source eventually is received at another location or at another time, digital data usually is represented by a particular code. Examples of codes that have been used in various types of digital transmission systems include (1,7) codes, MFM codes, Manchester codes, and the like. Many of these codes have been developed for and continue to be quite useful in storage systems, such as magnetic digital storage devices. Such codes have been developed to prevent the original, useful digital data from being obliterated or rendered non-recoverable by the inherent characteristics of the transmission (of storage or recording) system.

It is expected that digital data will be subject to distortion as it is transmitted over a typical digital transmission system. For example, in the environment of digital recording, it is not unusual for digital data to be recorded serially by bit; and to experience distortion and interference, such as interbit interference, due to the inherent magnetic characteristics of the recording system, particularly when the digital data is played back. To account for such distortion, the encoded digital signals often are pre-coded before being transmitted (or recorded), such that predicted distortion or interference will complement the pre-coding. Hence, the combination of the pre-coding and inherent distortion characteristics will result in a digital signal from which the original digital information can be easily recovered.

The receiver (or data reproducer) of a digital transmission system often is provided with a linear equalizer which carries out high frequency compensation on the received (or reproduced) digital signal. Of course, this compensation is intended to match, or balance, the characteristics of the transmission system. The compensated digital signal then is decoded to recover the original digital information. One type of decoder that can be used when superimposed noise is expected is a so-called Viterbi decoder which functions to sample the compensated signal, correlate the resultant samples and produce digital information as a function of such correlation. A Viterbi decoder is described in "Viterbi Algorithm," by G. D. Forney, Jr., Proc. of IEEE, Vol. 61, No. 3, March 1973, p. 268 et seq. In the environment wherein so-called white Gaussian noise is expected, this type of correlation decoder operates satisfactorily. This is because white noise essentially is not correlatable with useful information.

However, if substantial high frequency noise is present on the received (or reproduced) digital signal, high frequency compensation tends to emphasize not only the useful digital signals but also the superimposed high frequency noise. Since high frequency noise correlates with useful digital information, correlation decoding is subject to errors, thereby degrading the error rate of the overall digital transmission system.

SUMMARY OF THE INVENTION

Therefore, it is an object of the present invention to provide apparatus having an improved error rate for regenerating a coded digital signal having superimposed high frequency noise.

Another object of this invention is to provide apparatus for recovering digital signals from a digital transmission system.

A further object of this invention is to provide apparatus for recovering, with improved error rate, digital information that is reproduced from a digital storage system.

An additional object of this invention is to minimize high frequency noise in a digital signal recovered from a magnetic medium and supplied to a correlation decoder.

Still another object of this invention is to improve the accuracy and, thus, the error rate, of a correlation decoder used to recover a digital signal reproduced from a magnetic medium.

Various other objects, advantages and features of the present invention will become readily apparent from the ensuing detailed description, and the novel features will be particularly pointed out in the appended claims.

In accordance with this invention, an input digital signal is supplied to an interference cancellation equalizer which includes a compensator for high frequency compensating the input digital signal, an extractor for extracting intercode interference from the compensated digital signal and a subtracter for subtracting the extracted intercode interference from the digital signal to produce a waveform equalized signal. A decoder receives the waveform equalized signal, produces samples of that signal and correlates those samples to regenerate the coded digital signal.

As one aspect of this invention, the input digital signal is reproduced from a magnetic medium. As another aspect, a linear equalizer is used to emphasize high frequency components in the digital signal.

As a further aspect of this invention, the extractor includes a comparator which receives the high frequency compensated digital signal and compares it to a threshold level to produce a comparator output. A plural stage shift register receives and shifts the comparator output through its stages; and the contents of selected stages of the shift register are summed.

As yet another aspect of this invention, the threshold level to which the high frequency compensated digital signal is compared is an average level of that compensated digital signal.

As a feature of this invention, the high frequency compensated digital signal is formed of pre-coded digital information; and the extractor includes an encoder, such as a $(1+D)$ encoder, where D is the bit interval of the digital signal.

In accordance with still another aspect of this invention, a serial digital signal that has been recorded on a magnetic medium in pre-coded form $1/(1-D^2)$ is recovered by reproducing the pre-coded digital signal from the magnetic medium, equalizing the reproduced digital signal by high frequency compensation equalizing, encoding the reproduced equalized digital signal to produce a $(1+D)$ encoded digital signal, extracting an intercode interference component from the encoded digital signal, and subtracting the extracted intercode interference component from the reproduced precoded digital signal that has been waveform corrected to reduce interbit interference therein. As a result, a waveform equalized signal is produced, and this signal is supplied to a correlation decoder which recovers the original digital signal as a function of the correlation of samples of the waveform equalized signal.

As a feature of the aforementioned aspect, waveform correction to reduce interbit interference includes encoding the reproduced digital signal by a (1+D) encoder.

As yet another feature of this aspect of the invention, intercode interference is extracted from the (1+D) encoded, equalized digital signal by selecting therefrom bits which precede and succeed, respectively, a predetermined bit, weighting those selected bits, and summing the weighted bits to produce the intercode interference component.

BRIEF DESCRIPTION OF THE DRAWINGS

The following detailed description, given by way of example, and not intended to limit the present invention solely thereto, will best be understood in conjunction with the accompanying drawings in which:

FIGS. 5A-5E are waveform diagrams which are useful in understanding the operation of the present invention;

FIG. 7 is a block diagram of a basic, simple embodiment of the teachings of the present invention.

DETAILED DESCRIPTION OF PREFERRED EMBODIMENTS

Figure 1:
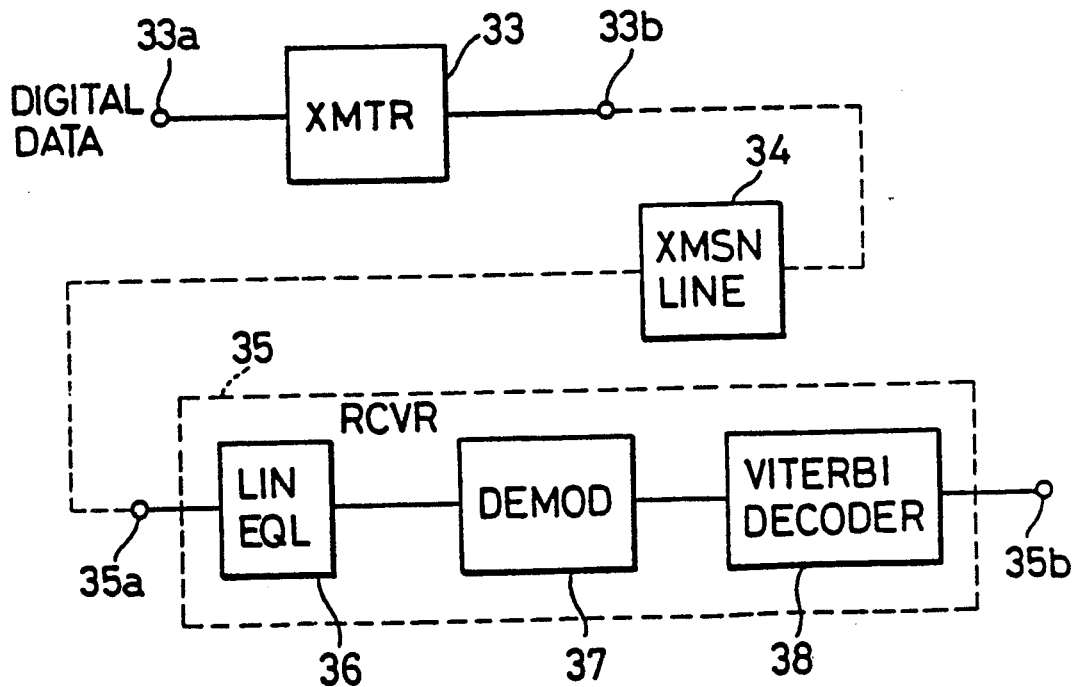
FIG. 1 is a block diagram of a digital transmission system which exhibits difficulties that are overcome by the present invention.

Before describing the present invention, reference is made to FIG. 1 which illustrates a digital transmission system in which high frequency noise interferes with successful recovery of digital information transmitted thereover. The digital transmission system includes a transmission line 34, as may be used to communicate digital data from one location to another, coupled to a transmitter 33 to which digital data is supplied via an input terminal 33a. This digital data is pre-coded by the transmitter; and a pre-coded digital signal train, such as a serial bit train, is applied to transmission line 34 by a transmitter output terminal 33b.

Digital signals transmitted over transmission line 34 are supplied to an input terminal 35a of a receiver 35 which functions to recover the original digital data. Broadly, receiver 35 includes a linear equalizer 36 which carries out high frequency compensation on the received digital signals. The compensated digital signals are demodulated by a demodulator 37 which is designed to match the characteristics of transmission line 34. As will be recognized, the demodulator is complementary to the encoder or modulator used at transmitter 33 to encode or modulate the transmitted digital data. Once demodulated, the digital signals are supplied to a correlation decoder shown, for example, as a Viterbi decoder 38. The output of the decoder at terminal 35b is expected to be the original digital data that had been supplied to input terminal 33a.

Figure 2:
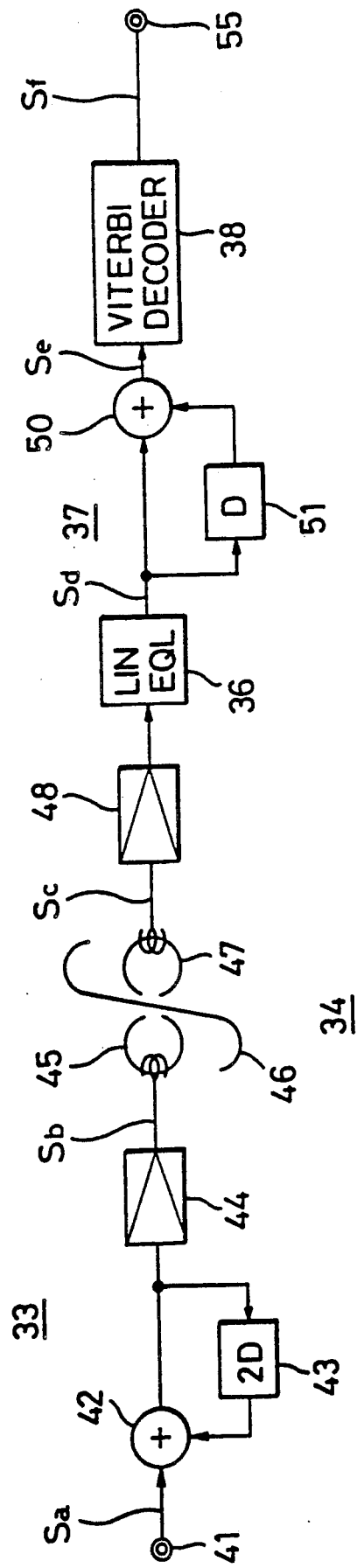
FIG. 2 is a block diagram of magnetic recording/reproducing apparatus which exhibits performance degradation which is overcome by the present invention.

One example of a digital transmission system is a digital recording/reproducing system of the type shown broadly in FIG. 2. Here, digital information is recorded on a magnetic medium 46, such as a magnetic tape. The characteristics of the magnetic medium are taken into account by the recording and reproducing apparatus which may be thought of as a partial response class IV system, such as described in Kobayashi et al. "Application of Partial Response Channel Coding to Magnetic Recording Systems," IBM Journ. of Res. and Dev., July 1970, p. 368 et seq.; Newly et al., "The Effects of Nonlinear Distortion on Class IV Partial Response," IEEE Trans. of Magnetics, Vol. Mag 22, No. 5, Sept. 1986, p. 1203 et seq.

The recorder includes an input terminal 41 which receives a digital signal that has been processed to eliminate, or at least substantially minimize, any DC component therein. It is known that a DC component cannot be adequately recorded on a magnetic medium and, thus, this component is removed to minimize distortion. This input digital signal Sa is subjected to pre-coding having a transfer characteristic of $1/(1-D^2)$, where D is a bit interval, or bit cell period of the input digital signal. This pre-coding is carried out by an adder 42 whose output is fed back thereto by a two-bit delay circuit 43. It will be appreciated that adder 42 carries out modulo 2 addition, that is, an exclusive OR operation.

The $1/(1-D^2)$ pre-coded digital signal is amplified by a recording amplifier 44 and recorded on magnetic medium 46 as pre-coded signal Sb by a suitable recording head 45. The recorded signal subsequently is reproduced by a reproducing head 47. It will be seen that the combination of the magnetic medium, record and reproducing heads is analogous to aforedescribed transmission line 34 and the precoder and amplifier are analogous to aforedescribed transmitter 33. Signal recovery apparatus analogous to aforedescribed receiver 35 is comprised of a reproducing amplifier 48 which supplies the reproduced pre-coded digital signal from reproducer head 47 to equalizer 36.

Head 45, magnetic medium 46 and head 47 comprise an electromagnetic conversion system exhibiting a transfer characteristic $(1-D)$. Accordingly, the pre-coded digital signal Sb is subject to $(1-D)$ transformation, resulting in reproduced signal Sc. This reproduced signal is high frequency compensated by linear equalizer 36, resulting in compensated signal Sd. The compensated signal is encoded by the combination of an adder 50, which receives the high frequency compensating signal Sd directly from linear equalizer 36, and a 1-bit delay circuit 51, which delays that compensated signal Sd and adds it to the undelayed signal.

The output Se of this (1+D) encoder is seen to have been subjected to the pre-coding of the recording circuit, to the $(1-D)$ transformation of the electromagnetic conversion system, and to the $(1+D)$ encoding of adder 50 and delay circuit 51. The combination of this pre-coding, electromagnetic transformation and encoding may be expressed as follows:

$$1/(1-D^2) \times (1-D) \times (1+D) = 1$$

Thus, by reason of the pre-coding and encoding, the characteristics of the electromagnetic conversion system are compensated, resulting in an overall transfer function of unity. The resultant signal Se produced by the (1+D) encoder is a three-level signal which is decoded into a two-level digital signal by viterbi decoder 38. That is, the three-level signal Se is correlated to recover the original digital information Sf where, ideally, Sf=Sa.

Figure 3:
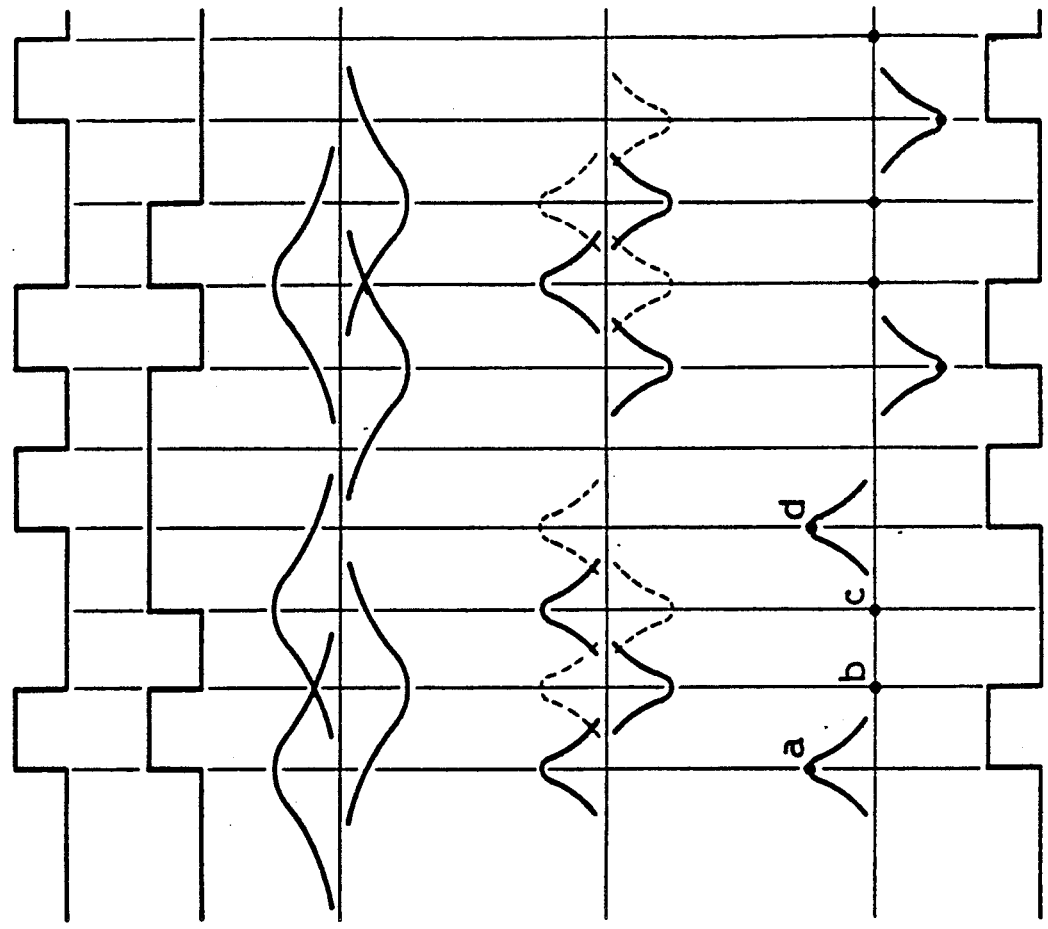
FIGS. 3A-3F are waveform diagrams which are useful in understanding the operation of the system shown in FIG. 2.

The manner in which the recording/reproducing apparatus shown in FIG. 2 operates will best be appreciated by referring to the waveform diagrams shown in FIGS. 3A–3F. FIG. 3A represents the original input digital signal Sa; and FIG. 3B represents the pre-coded digital signal Sb, where Sb = Sa $[1/(1-D^2)]$.

The pre-coded signal Sb is subject to inherent $(1-D)$ transformation by the differentiating characteristics of the electromagnetic conversion system, resulting in a signal which is best represented by the superimposed components shown in FIG. 3C. These components appear as gradual positive and negative pulses produced by the positive and negative transitions of the pre-coded signal Sb. It will be recognized that the frequency characteristics of the electromagnetic conversion system are primarily responsible for the wave shapes of the individual, superimposed components shown in FIG. 3C. These wave shapes are particularly influenced by the presence or absence of high frequency components in the electromagnetic conversion system. In a system having relatively few high frequency components, the wave shapes of the superimposed components are smooth, such as shown in FIG. 3C. However, the interbit interference of these individual components adversely affects some codes which are used to represent and record the original input digital signal. These components also adversely affect the operation of a decoder used to recover the reproduced signal Sc.

Linear equalizer 36 functions to emphasize the high frequency components which are included in the superimposed components of FIG. 3C. That is, the equalizer performs high frequency compensating equalization to compensate the frequency characteristics of the electromagnetic conversion system. Such frequency compensated signal Sd is shown by the solid lines of FIG. 3D. A comparison of FIG. 3D with FIG. 3C illustrates the higher frequency compensation which is achieved by the linear equalizer in which interbit interference is reduced. This compensated signal Sd is delayed by 1-bit delay circuit 51, resulting in the delayed, compensated signal represented by the broken lines of FIG. 3D. Adder 50 adds the delayed and undelayed compensated signals, resulting in the summed signal Se shown in FIG. 3E. This summed signal exhibits positive, negative and zero levels; and this tri-level signal is decoded by decoder 38. For example, the decoder may produce samples of the tri-level signal Se at sample points a, b, c, d and so on, and these samples are correlated to regenerate the original input signal Sf as shown in FIG. 3F.

Decoder 38 typically is designed with the assumption that any noise which may be superimposed on signal Se is white Gaussian noise. Since white Gaussian noise is not correlatable, that noise generally does not interfere with the correlation operation from which digital signal Sf is recovered. However, high frequency noise generally may be closely correlated to the tri-level signal Se shown in FIG. 3E. Hence, if high frequency informational noise is superimposed onto this signal, as may be attributed to linear equalizer 36, correlation decoding of signal Se may not result in the accurate recovery of digital signal Sf. That is, linear equalizer 36 may emphasize both high frequency informational components of the reproduced, superimposed components Sc as well as high frequency noise that may be recovered from the magnetic medium. Consequently, the error rate of decoder 38 may be unacceptably high when high frequency emphasis is provided by linear equalizer 36.

Figure 4:
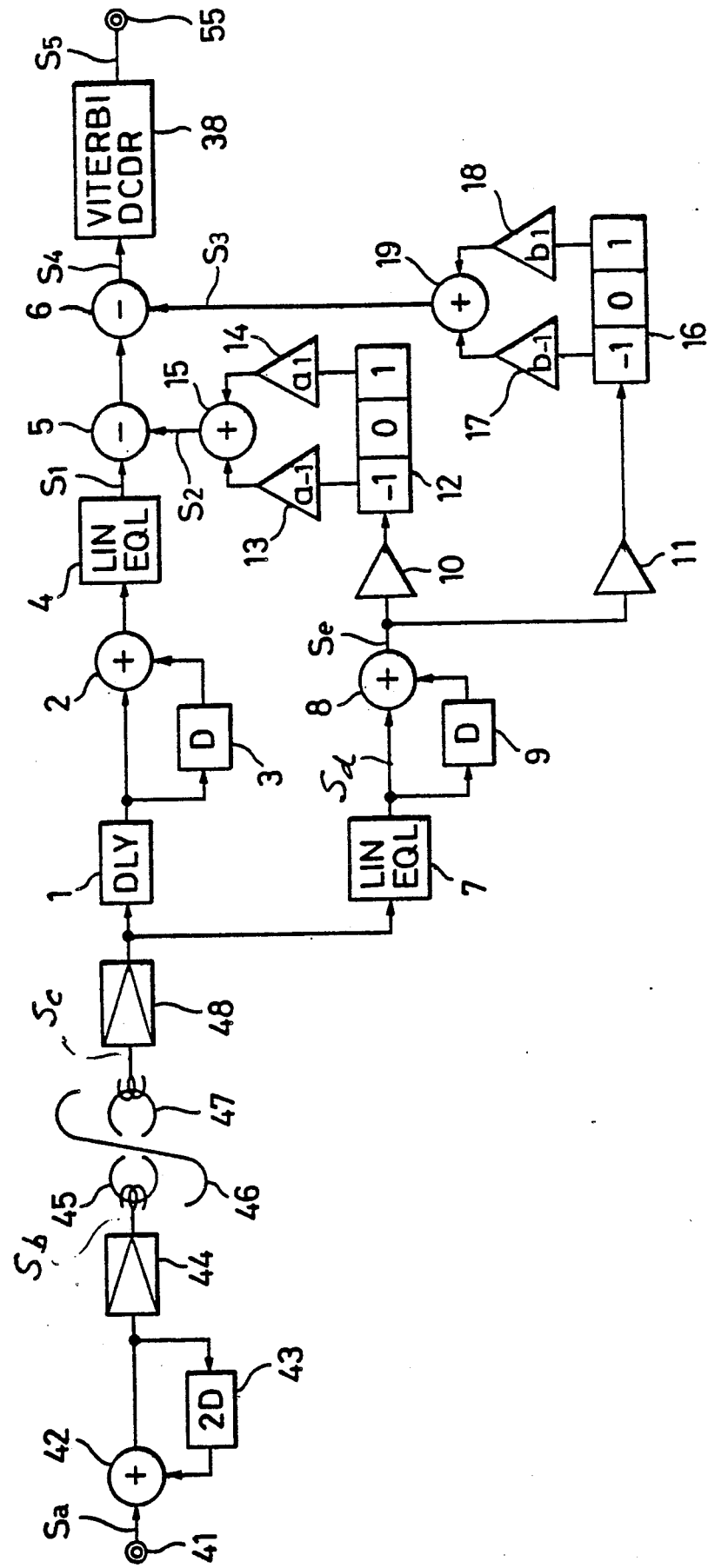
FIG. 4 is a block diagram of one embodiment of the present invention.

The problem of emphasizing both useful information and high frequency noise is avoided by the present invention, one embodiment of which is illustrated in FIG. 4. The illustrated embodiment is shown in the environment of a recording/reproducing system; and the same reference numerals are used to identify those elements which have been described previously with respect to FIG. 2. Signal Sc (shown in FIG. 3C) is supplied by amplifier 48 to a linear equalizer 7 (which may be similar to high frequency compensating equalizer 36) to produce emphasized signal Sd which is encoded by (1+D) encoder formed of adder 8 and 1-bit delay circuit 9. Equalizer 7, adder 8, and delay circuit 9 are substantially the same as aforedescribed equalizer 36, adder 50, and delay circuit 51 to produce tri-level signal Se, shown in FIG. 3E. An intercode interference component is extracted from tri-level signal Se and subtracted from the reproduced digital signal Sc to produce an equalized signal which may be decoded by viterbi decoder 38 with improved error rate. Decoder 38 is illustrated as a Viterbi decoder, but it should be understood that the present invention need not be limited solely for use with a Viterbi decoder and other decoders which operate in a similar or analogous manner may be used. For convenience, decoder 38 is referred to as a Viterbi decoder and will be understood to be a Viterbi-like decoder.

The reproduced digital signal Sc is supplied through a delay circuit 1 (the purpose of which is described below) to an interbit interference reducing circuit formed as a (1+D) encoder comprised of an adder 2 and a 1-bit delay circuit 3. The output of delay circuit 1 is supplied directly to adder 2 to which a delayed version of this signal is added. The (1+D) encoded signal output from adder 2 is coupled to a subtracter 5 by a low gain linear equalizer 4. Equalizer 4 provides low gain high frequency compensation to the (1+D) encoded reproduced digital signal so as to correct its waveform. As will be described below, subtracter 5 is adapted to subtract positive intercode interference components from the corrected waveform signal produced by linear equalizer 4; and the output of this subtracter is coupled to another subtracter 6 which is adapted to subtract negative intercode interference components from the corrected waveform signal. The resultant waveform equalized signal produced by subtracter 6 is decoded by viterbi decoder 38.

Positive intercode interference components are extracted from signal Se by a comparator 10, a shift register 12, weighting circuits 13 and 14 and a summing circuit 15. Negative interference intercode components are extracted from signal Se by a comparator 11, a shift register 16, weighting circuits 17 and 18 and a summing circuit 19. Comparator 10 is provided with a positive threshold level (not shown) to produce a positive output signal (or bit indications) when the level of signal Se exceeds this positive threshold. Similarly, comparator 11 is provided with a negative threshold level to produce bit indications when the negative level of signal Se exceeds this negative threshold. The bit indications output from comparator 10 are clocked into plural stage shift register 12, of which only 3 stages are shown. Likewise, the bit indications output from comparator 11 are clocked into plural stage shift register 16.

A predetermined stage of shift register 12 is designated as stage 0, a preceding stage is designated as stage −1 and a succeeding stage is designated as stage 1. Similarly, a predetermined stage of shift register 16 is designated as stage 0, a preceding stage is designated as stage −1, and a succeeding stage is designated as stage 1. Thus, the bits which are shifted through the stages of shift registers 12 and 16 may be represented as bits −1, 0, and +1, respectively. The contents of stages −1 and +1 of shift register 12, that is, bits −1 and +1, are weighted by weighting circuits 13 and 14, respectively, and summed in summing circuit 15. Likewise, the contents of stages −1 and +1 of shift register 16, that is, bits −1 and +1, are weighted by weighting circuits 17 and 18, respectively, and summed in summing circuit 15 is subtracted in subtracter 5 from the corrected waveform signal produced by linear equalizer 4 and the summed signal produced by summing circuit 19 is subtracted in subtracter 6 from the output of subtracter 5.

Referring to the waveform diagrams shown in FIGS. 5A–5E, as well as the previously described waveform diagrams shown in FIGS. 3A–3F, it is assumed that input digital signal Sa is pre-coded by $1/(1−D^2)$ to produce precoded signal Sb for recording on magnetic medium 46. When reproduced, the resultant digital signal appears as shown in FIG. 3C. The $(1+D)$ encoded formed of adder 2 and delay circuit 3 tends to reduce the interbit interference shown in FIG. 3C. Linear equalizer 4 provides additional waveform correction, resulting in waveform corrected signal S1 shown in FIG. 5A.

The reproduced digital signal Sc is subject to high frequency compensation by linear equalizer 7, resulting in the high frequency compensated signal Sd, shown in FIG. 3D. After $(1+D)$ encoding, this high frequency compensated signal appears as shown in FIG. 3E. Intercode interference components are extracted from this $(1+D)$ encoded digital signal Se, resulting in the intercode interference components S2 and S3, shown in FIGS. 5B and 5C, respectively.

Positive and negative intercode interference components are extracted from tri-level signal Se by the two similar positive and negative extraction circuits described above. Previously described weighting circuits 13 and 14 may be formed as amplifiers having gains $A_{−1}$ and $A_1$, respectively, to amplify bit −1 and bit +1 of shift register 12 through which bit indications produced by comparator 10 are shifted. Likewise, previously described weighting circuits 17 and 18 may be formed as amplifiers having gains $B_{−1}$ and $B_1$ for amplifying bit −1 and bit +1 of shift register 16 through which the bit indications produced by comparator 11 are shifted. The weighted bits produced by amplifiers 13 and 14 are summed to produce the intercode interference component shown in FIG. 5B and the weighted bits produced by amplifiers 17 and 18 are summed in summing circuit 19 to produce the intercode interference component S3 shown in FIG. 5C.

Subtracters 5 and 6 are connected in cascade to receive the waveform-corrected signal as produced by linear equalizer 4. Subtracter 5 subtracts the positive intercode interference component S2 from waveform-corrected signal S1 to produce a positive waveform-equalized signal. It is appreciated that the negative waveforms of signal S1 pass through subtracter 5 without any modification. Subtracter 6 subtracts the negative intercode interference component S3 from the corrected waveform signal S1, the negative waveforms of which pass through subtracter 5 without modification, resulting in a negative waveform-equalized signal. The composite waveform-equalized signal, that is, the corrected waveform signal from which positive and negative intercode interference components have been removed, is shown in FIG. 5D as waveform-equalized signal S4. This waveform-equalized signal is decoded by viterbi decoder 38 which, as mentioned above, samples to recover the original digital information, shown as S5 in FIG. 5E.

In the embodiment shown in FIG. 4, the bit indications which precede and succeed a particular bit indication produced by comparator 10 (and also by comparator 11) are weighted and summed to provide the intercode interference component which is subtracted from the waveform corrected signal S1. If a presently received bit is loaded into stage −1 of the shift register, then the next preceding bit is stored in stage 0 and the second preceding bit is stored in stage +1. The bit stored in stage 0 is assumed herein to be the particular or predetermined bit indication discussed above. Thus, the predetermined bit indication stored in stage 0 is delayed by 1 bit period (or bit interval) with respect to the bit indication loaded into stage −1. This delay, together with other inherent delays that may be present in comparators 10 and 11 is compensated by the delay provided by delay circuit 1 which is approximately equal to these cumulative delays.

From the foregoing description, it is seen that high gain high frequency compensating equalization is provided to extract the intercode interference components. However, the high frequency compensation imparted by equalizer 4 to the input digital signal from which the intercode interference component is subtracted is of a relatively low gain. Consequently, the resultant waveform equalized signal S4 is not accompanied by emphasized high frequency noise. Therefore, the correlation of the noise component which accompanies this signal is relatively low; and viterbi decoder 38 operates with relatively low error rate. That is, the noise component which accompanies the waveform equalized signal is approximately white Gaussian noise.

Figure 6:
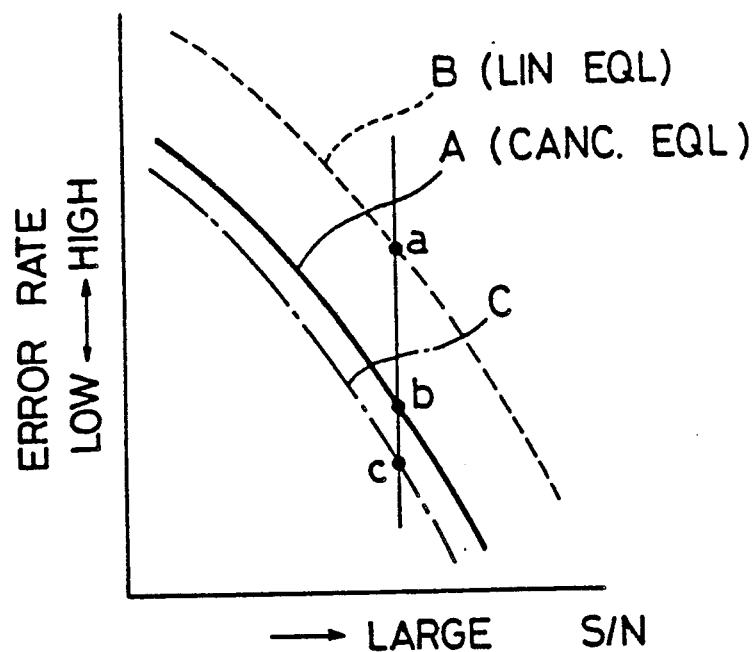
FIG. 6 is a graphical representation of the error characteristics of a correlation decoder, which characteristics are improved by the present invention.

FIG. 6 is a graphical representation which best compares the improved error rate attained by the present invention to the error rate attained by the digital data recovery arrangement shown in FIG. 2. In particular, FIG. 6 represents the relationship between the error rate of viterbi decoder 38 (in both FIGS. 2 and 4) and the signal-to-noise (S/N) ratio of the digital signal supplied to the decoder. Curve A represents the error rate when the intercode interference is cancelled from the reproduced digital signal, as achieved by the embodiment shown in FIG. 4. Curve B represents the error rate when high gain high frequency compensation is applied to the input digital signal, as is done in the arrangement shown in FIG. 2. Curve C represents the error rate when the digital signal supplied to the viterbi decoder is accompanied solely by Gaussian noise.

For a given S/N of viterbi decoder 38, the error rate achieved by the present invention, as represented by point b, is seen to be only slightly higher than what appears to be the best error rate that can be achieved by the viterbi decoder, as represented by point c. This error rate b is seen to be a substantial improvement over the error rate which is achieved for the same S/N by the arrangement shown in FIG. 2, as represented by point a.

The gains or weighting coefficients $A_{-1}$, $A_1$, $B_{-1}$, and $B_1$ of the weighting circuits shown in FIG. 4 are a function of the wave shapes of the superimposed components which constitute the reproduced digital signal Sc, these components being shown in FIG. 3C. Since these components are subjected to a low gain high frequency compensation by linear equalizer 4, resulting in corrected waveform S1 shown in FIG. 5A, the weighting coefficients also are a function of the compensation provided by equalizer 4. In theory, this equalizer may be omitted. However, in that event, the weighting coefficients will be increased; and this may produce a significant error when the intercode interference component is subtracted from the recovered digital signal. By including equalizer 4, these weighting coefficients may be reduced. Thus, the interrelationship between equalizer 4 and the weighting coefficients is such that an increase in one may be accompanied by a decrease in the other.

The embodiment shown in FIG. 4 illustrates a desired embodiment in the environment of a recording/reproducing system. A more general embodiment of the present invention is illustrated in FIG. 7, wherein the input digital signal supplied to the interference cancellation equalizing arrangement 20 need not be limited solely to that recovered from a magnetic medium.

In the FIG. 7 embodiment, the input digital signal is supplied to a subtracter 23, which is analogous to aforedescribed subtracter 5, by way of a delay circuit 21 and a linear equalizer 22. Delay circuit 21 may be analogous to aforedescribed delay circuit 1; and linear equalizer 22 is analogous to aforementioned linear equalizer 4. It is seen that the $(1+D)$ encoder use in the FIG. 4 embodiment is not employed in the FIG. 7 embodiment.

The interference component is extracted by means of a comparator 25 which is supplied with the high frequency digital signal produced by linear equalizer 24 (which substantially similar to aforedescribed linear equalizer 7) and which receives a threshold level produced by an average level detector 26 and derived from the of the equalizer 24. Thus, the high frequency signal provided by equalizer 24 is assumed to be a level signal (rather than the tri-level signal provided by equalizer 7 in FIG. 4) and is compared to a threshold level which is a function of the average amplitude (which may be both positive and negative) of the high frequency compensated digital signal.

Bit indications are produced by comparator 25 when the high frequency compensated digital signal exceeds the average threshold level produced by average level detector 26. These bit indications are supplied to and shifted through a shift register 27, which is similar to aforedescribed shift register 12. Thus, shift register 27 includes stage $-1$, stage 0, and stage $+1$; and weighting circuits 28 and 29 are coupled to stages $-1$ and $+1$, respectively, to weight the bit indications in these stages. The weighted bit indications are summed in a summing circuit 30 to produce the intercode interference component which is supplied to subtracter 23 to be subtracted from the input digital signal. The output of subtracter 23, which may be similar to waveform equalized signal S4 shown in FIG. 5D, is decoded by viterbi decoder 38.

While the present invention has been particularly shown and described with reference to preferred embodiments, it will be readily appreciated by those of ordinary skill in the art, that various changes and modification may be made without departing from the spirit and scope of the invention. For example, a $(1+D)$ encoder formed of adder 8 and 1-bit delay circuit 9 (FIG. 4) may be viewed as a decoder. Also, the waveform correcting circuit comprised of the $(1+D)$ encoder formed of adder 2 and 1-bit delay circuit 3, and also including equalizer 4, are matched to the characteristics of the digital transmission system which, as described in conjunction with FIG. 4, comprises an electromagnetic conversion system having the characteristic $(1-D)$. Precoding of the digital signal before it is transmitted (or recorded) likewise is intended to match the characteristics of the digital transmission system. As the characteristics of this system change, the precoding likewise should be changed as should the characteristics of the encoders used in the data recovery arrangement. Thus, the encoders need not be limited solely to $(1+D)$ encoders. In any event, the present invention, and equivalents, provide relatively low gain high frequency emphasis to the waveform equalized digital signal, thereby minimizing the correlation of the noise component which may be superimposed thereon, and thus permitting correlation and decoding of the digital signal to recover the original digital information.

It is intended that the appended claims be interpreted as including the embodiments described herein, the modifications mentioned above, and all equivalents thereto.

What is claimed is:

1. Apparatus for regenerating an original digital signal that has been coded, comprising: input means for supplying an input digital signal representing said coded digital signal interference cancellation equalizing means coupled to said input means for cancelling an interference component from said input digital signal and including compensating means for high frequency compensating the input digital signal, extracting means for extracting intercode interference from the high frequency compensated input digital signal, and subtracting means for subtracting the intercode interference extracted from the high frequency compensated input digital signal from said input digital signal to produce a waveform equalized signal; and decoding means coupled to said interference cancellation equalizing means for producing samples of said waveform equalized signal and correlating said samples to regenerate the original digital signal.

2. The apparatus of claim 1 wherein said input means comprises magnetic reproducing means for reproducing said input digital signal from a magnetic medium.

3. The apparatus of claim 1 wherein said means for high frequency compensating the input digital signal comprises a linear equalizer for emphasizing high frequency components in said input digital signal.

4. The apparatus of claim 1 wherein said extracting means comprises comparator means for receiving the high frequency compensated input digital signal and comparing same to a threshold level to produce a comparator output if the high frequency compensated input digital signal exceeds said threshold level; plural stage shift register means for receiving and shifting therethrough the comparator output from said comparator means; and summing means for summing the contents of selected stages of said shift register means.

5. The apparatus of claim 4 further comprising average level detecting means for detecting an average level of said high frequency compensated input digital signal and supplying said average level to said comparator means as said threshold level.

6. The apparatus of claim 4 wherein the high frequency compensated input digital signal is formed of successive bit cells of pre-coded digital information, and said extracting means further comprises encoding means coupled to said compensating means for encoding the pre-coded digital information from said compensated digital signal and supplying encoded bit cell information to said comparator means.

7. The apparatus of claim 6 wherein said encoding means exhibits a transfer characteristic $(1+D)$, wherein D is a bit cell period.

8. The apparatus of claim 6 wherein said encoding means comprises delay means for delaying the high frequency compensated digital signal by a bit cell period, and summing means for summing the delayed and undelayed compensated digital signal.

9. The apparatus of claim 4 wherein said comparator means comprises positive and negative comparators for comparing said compensated digital signal to positive and negative threshold levels to produce respective comparator outputs if the compensated digital signal exceeds said positive or negative threshold levels; said plural stage shift register means comprises respective plural stage shift registers for receiving the comparator outputs from respective ones of the positive and negative comparators; and said summing means comprises respective summing circuits, each for summing the contents of selected stages of a respective shift register to produce respective summed outputs.

10. The apparatus of claim 9 wherein each shaft register includes a predetermined stage and stages preceding and succeeding said predetermined stage, the contents of said preceding and succeeding stages being supplied to a respective summing circuit.

11. The apparatus of claim 10 wherein said preceding and succeeding stages are adjacent said predetermined stage.

12. Apparatus for regenerating an original digital signal, comprising input means for supplying a pre-coded digital signal reproduced from a magnetic medium, interference cancellation equalizing means coupled to said input means for canceling an interference component from said input digital signal and including compensating means for high frequency compensating the input pre-coded digital signal; positive and negative comparators for comparing said compensated digital signal to positive and negative threshold levels to produce respective comparator outputs if the compensated pre-coded digital signal exceeds said positive or negative threshold levels; respective plural stage shift registers for receiving the comparator outputs from respective ones of the positive and negative comparators; respective summing circuits, each for summing the contents of selected stages of a respective shift register to produce respective summed outputs; correcting means for receiving said pre-coded digital signal to correct bit interference caused by said magnetic medium and produce a corrected waveform; respective subtracters connected in cascade to said correcting means, each for receiving a summed output from a respective summing circuit to subtract a summed output from said corrected waveform and thereby produce a waveform equalized signal; and decoding means coupled to said cascade-connected subtracters for producing samples of said waveform equalized signal and correlating said samples to regenerate the original digital signal.

13. The apparatus of claim 12 wherein each summing circuit includes weighting means for weighting the contents of the selected stages which are summed.

14. The apparatus of claim 13 wherein said correcting means includes a low gain linear equalizer for applying the corrected waveform to the cascaded subtracters.

15. The apparatus of claim 14 wherein said input digital signal is formed of successive bit cells of pre-coded digital information; and said correcting means further includes delay means for delaying said input digital signal by a bit cell period, and summing means for summing the delayed and undelayed input digital signal and supplying same to said low gain linear equalizer.

16. Apparatus for recovering a serial digital signal that has been recorded on a magnetic medium in pre-coded form $1/(1-D^2)$, wherein D is a bit interval of an original serial digital signal, said apparatus comprising:
reproducing means for reproducing the pre-coded digital signal from said magnetic medium;
equalizing means coupled to said reproducing means for high frequency compensation equalizing of the reproduced pre-coded digital signal;
encoding means for $(1+D)$ encoding of the reproduced equalized digital signal to produce a $(1+D)$ encoded digital signal;
extraction means coupled to said encoding means for extracting from the encoded digital signal inter-code interference components;
means coupled to said reproducing means for reducing intercode interference in the reproduced pre-coded digital signal to produce a corrected waveform signal representing the original digital signal;
subtracting means coupled to said extraction means and said means for reducing intercode interference for subtracting the extracted intercode interference components from the corrected waveform signal to produce a waveform equalized signal; and
correlation decoding means coupled to said subtracting means for recovering the original digital signal as a function of the correlation of samples of said waveform equalized signal.

17. The apparatus of claim 16 wherein said means for reducing intercode interference in the reproduced pre-coded digital signal includes additional encoding means for $(1+D)$ encoding of the reproduced digital signal.

18. The apparatus of claim 17 wherein said extraction means comprises bit selecting means for selecting bits that precede and succeed, respectively, a predetermined bit in said encoded digital signal, weighting means for weighting the selected bits, and summing means for summing the weighted bits to produce said intercode interference components.

19. The apparatus of claim 18 wherein said additional encoding means includes low gain equalizing means for providing low gain high frequency compensation to the $(1+D)$ encoded reproduced digital signal.

20. The apparatus of claim 16 wherein said extraction means comprises first and second comparator means for sensing when the encoded digital signal exceeds positive and negative threshold levels, respectively, to produce bit indications thereof; first and second plural stage shift register means for receiving and shifting therethrough the bit indications produced by said first and second comparator means, respectively; first and second weighting means coupled to selected stages of said first and second shift register means, respectively, to weight the bit indications in said selected stages; and first and second summing means, each for summing the weighted bit indications of the selected stages of a respective shift register to produce an intercode interference component.

21. The apparatus of claim 20 wherein said subtracting means comprises first and second subtracters for subtracting first and second intercode interference components produced by said first and second summing means from said corrected waveform signal.

22. The apparatus of claim 20 wherein said selected stages of said first and second shift register means comprise a stage preceding a predetermined stage and a stage succeeding said predetermined stage in each respective shift register means.

23. Apparatus for recovering a serial digital signal from an electromagnetic conversion system having a transfer characteristic $(1-D)$, wherein D is a bit interval of an original digital signal supplied to said electromagnetic conversion system in pre-coded form $1/(1-D^2)$, said apparatus comprising: first high frequency compensating means for correcting the wave shape of a serial digital signal received from said electromagnetic conversion system; second high frequency compensating means for producing a high frequency compensated serial digital signal from the serial digital signal received from said electromagnetic conversion system: extracting means for extracting from the high frequency compensated serial digital signal produced by said second high frequency compensating means a high frequency compensated intercode interference component; subtracting means for subtracting the extracted intercode interference component from the wave shape corrected digital signal produced by the first high frequency compensating means to produce a waveform equalized signal; and decoding means for decoding said waveform equalized signal to recover original digital information.

24. The apparatus of claim 23 wherein said extracting means comprises a linear equalizer for emphasizing the high frequency characteristics of the digital signal received from said electromagnetic conversion system; level detecting means for detecting when the high frequency emphasized digital signal exceeds a threshold level to produce successive bit indications; bit selecting means coupled to said level detecting means for selecting particular ones of said successive bit indications; weighting means for weighting the selected bit indications; and summing means for summing the weighted bit indications to produce a high frequency compensated intercode interference component.

25. The apparatus of claim 24 wherein said level detecting means includes a comparator, and average level generating means for generating an average level of the high frequency emphasized digital signal and supplying same to said comparator as said threshold level.

26. The apparatus of claim 23 wherein said first high frequency compensating means comprises $(1+D)$ encoding means for producing a $(1+D)$ encoded digital signal; and low gain equalizing means for providing low gain high frequency compensation to said $(1+D)$ encoded digital signal.

27. Apparatus for recovering a serial digital signal from an electromagnetic conversion system having a transfer characteristic $(1-D)$, wherein D is a bit interval of an original digital signal supplied to said electromagnetic conversion system in pre-coded form $1/(1-D^2)$, said apparatus comprising: wave shape correcting means for correcting the wave shape of a serial digital signal received from said electromagnetic conversion system; a linear equalizer for emphasizing the high frequency characteristics of the digital signal received from said electromagnetic conversion system; $(1+D)$ encoding means coupled to said linear equalizer for producing a $(1+D)$ encoded, high frequency emphasized digital signal; first and second comparators having first and second threshold levels for detecting when the $(1+D)$ encoded, high frequency emphasized digital signal is greater than said first threshold level and is less than said second threshold level to produce respective first and second sets of successive bit indications; bit selecting means coupled to said first and second comparators for selecting particular ones of said successive bit indications; weighting means for weighting the selected bit indications; summing means for summing the weighted bit indications to produce a high frequency compensated intercode interference component; subtracting means for subtracting the extracted intercode interference component from the wave shape corrected digital signal received from said electromagnetic conversion system to produce a waveform equalized signal; and decoding means for decoding said waveform equalized signal to recover original digital information.

28. The apparatus of claim 27 wherein said bit selecting means comprises first and second plural stage shift registers for receiving and shifting therethrough said respective first and second sets of successive bit indications, each shift register having selected stages coupled to said weighting means to supply thereto bit indications which precede and succeed, respectively, a predetermined bit indication.

29. The apparatus of claim 28 wherein said weighting means comprises first and second weighting circuits, each coupled to a respective one of said shift registers to receive said preceding and succeeding bit indications therefrom.

30. The apparatus of claim 29 wherein said subtracting means comprises first and second subtracters connected in cascade to said wave shape correcting means and supplied with outputs from said summing means to subtract said outputs from the wave shape corrected digital signal.

31. Apparatus for recovering a serial digital signal that has been recorded on a magnetic medium in pre-coded form $1/(1-D^2)$, wherein D is a bit interval of an original serial digital signal, said apparatus comprising:
reproducing means for reproducing the pre-coded digital signal from said magnetic medium;
equalizing means coupled to said reproducing means for high frequency compensation equalizing of the reproduced pre-coded digital signal;
encoding means for $(1+D)$ encoding of the reproduced equalized digital signal to produce a $(1+D)$ encoded digital signal;
first and second comparator means for sensing when the encoded digital signal exceeds positive and negative threshold levels, respectively, to produce bit indications thereof;
first and second plural stage shift register means for receiving and shifting therethrough the bit indications produced by said first and second comparator means, respectively;

first and second weighting means coupled to selected stages of said first and second shift register means, respectively, to weight the bit indications in said selected stages;

first and second summing means, each for summing the weighted bit indications of the selected stages of a respective shift register to produce an intercode interference component;

means coupled to said reproducing means for reducing interbit interference in the reproduced precoded digital signal to produce a corrected waveform signal representing the original digital signal;

first and second subtracters connected in cascade for subtracting first and second intercode interference components produced by said first and second summing means from said corrected waveform signal to produce a waveform equalized signal; and correlation decoding means coupled to the cascade-connected subtracters for recovering the original digital signal as a function of the correlation of samples of said waveform equalized signal.

* * * * *